Patented Oct. 10, 1950

2,525,227

UNITED STATES PATENT OFFICE 2,525,227

ION EXCHANGE RESINS

Charles G. Laube, Stamford, Conn., assignor to American Cyanamid Company, New York, N. Y., a corporation of Maine No Drawing. Application February 20, 1946, Serial No. 649,128

4 Claims. (Cl. 260—67.6)

This invention relates to anion active resinous materials and more particularly, to anion active resins having a low density.

Anion active resins have been prepared which comprise the reaction product of a condensation product of an amino compound and an aldehyde with a substance containing a guanido group as described in the copending application of James R. Dudley, Serial No. 607,277, filed July 26, 1945, and now abandoned. The resins described and claimed in this copending application have achieved commercial success but they possess one definite disadvantage; namely, the density of these resins which generally runs about 30–32 lbs. per cubic foot of resin is in many cases undesirably high.

Attempts have been made to modify the anion active resins referred to in the preceding paragraph but either they have been unsuccessful in decreasing the density or they have achieved a decrease in density with an accompanying marked decrease in capacity for the removal of anions from solution. A few of these attempts are described in the following paragraphs.

The amount of acid used to bring about gelation of the condensation product of a substance containing a guanido group with a condensation product of an amino compound and an aldehyde has been increased. This affects the density of the final resin very little and, at the same time, decreases the capacity considerably.

The drying cycle has been varied. For example, instead of a stepwise rise to 100° C. and holding at 100° C. for 5 hours, the resin has been subjected to a 6-hour drying at 120° C. Such variations in the drying cycle have been found to exert no influence on the density of the resin, nor has drying the resin by azeotropic distillation of benzene and butanol been any more successful. In this latter case the density can be decreased, but the decrease is accompanied by a considerable lowering of the capacity. If the resin is washed with water or dilute acid or alkali before it is dried, the density decreases but so does the capacity and, moreover, the resin is more soluble and less stable. Similarly, a wet curing operation will lower not only the density but also the capacity of the resin.

It has also been attempted to decrease the density of the anion exchange resins in question by the addition of inert fillers such as kieselguhr, Darco, cotton flock, etc. Here again, decreased density is often accompanied by a marked decrease in capacity.

It is an object of the present invention to prepare an anion active resin of low density.

It is another object of the present invention to prepare an anion active resin from a substance containing a guanido group and a condensation product of an imino compound and an aldehyde in such a manner that the resin obtained has a low density.

Another object of the present invention is to prepare an anion exchange resin which is suitable for use in anion exchange processes in which decolorization of the anion containing medium is required in addition to demineralization.

Still another object of the present invention is to prepare an anion exchange resin which because of its low density or high porosity requires less rinse water in the regeneration or activation steps than a resin of similar chemical composition but higher density.

It is another object of the present invention to produce an anion active resin of low density which has substantially as high a capacity for removing anions from liquids as an anion active resin of similar chemical structure but higher density.

These and other objects are attained by gelling the condensation product of a substance containing a guanido group such as guanidine nitrate with a condensation product of an amino compound such as melamine or urea and an aldehyde such as formaldehyde in the presence of a definite excess of water.

A further object of the present invention is the removal of anions from solutions or the exchange of anions in solution.

This and other objects of the present invention are attained by contacting the anion-containing liquid or solution with an anion active resin prepared as described above.

The invention will be described in greater detail in conjunction with the following specific examples which are merely illustrative, and it is not intended that the scope of the invention be restricted to the exact details therein set forth. Proportions are given in parts by weight unless otherwise indicated.

Example 1

356 parts of water (19.8 mols)
126 parts of melamine (1 mol)
10.4 parts of triethanolamine (0.697 mol)
405 parts of 37% formaldehyde (5 mols)
183 parts of guanidine nitrate (1.5 mols)
156 parts of water (8.66 mols)
44.9 parts of concentrated sulfuric acid (95.5%) (0.439 mol)

Total water: 28.6 mols

A slurry of the melamine in 356 parts of water is mixed with the triethanolamine and the formaldehyde in a vessel suitably equipped with means for agitation, and the mixture is heated to 80° C. At this stage the guanidine nitrate is added, causing the temperature of the solution to drop to about 65° C. The pH of this solution is 7.5 to 8.0. After agitation at the lower temperature for about 10 minutes, the charge is cooled further to 40° C., and a solution of the sulfuric acid in the 156 parts of water is added.

The syrup is agitated for several minutes and then it is permitted to gel. The gel is aged for about 17 hours, then granulated, and then dried for 3 hours at 50° C., 1 hour to 80° C., 2 hours at 80° C. and 3 hours at 100° C.

The resulting resin has a capacity for removing anions from solution equivalent to 14.7 kilograins of calcium carbonate per cubic foot of resin and a density of about 23.8 lbs./cu. ft.

Example 2

426 parts of water (23.7 mols)
126 parts of melamine (1 mol)
10.4 parts of triethanolamine (0.697 mol)
405 parts of 37% formaldehyde (5 mols)
183 parts of guanidine nitrate (1.5 mols)
156 parts of water (8.66 mols)
44.9 parts of concentrated sulfuric acid (95.5%) (0.439 mol)
Total water: 32.3 mols The procedure of Example 1 is followed. The resin obtained has a capacity of from about 13.5 to 17.5 kilograins of calcium carbonate per cubic foot of resin and a density of from 15 to 17.5 lbs./cu. ft.

Example 3

426 parts of water (23.7 mols)
126 parts of melamine (1 mol)
10.4 parts of triethanolamine (0.697 mol)
405 parts of 37% formaldehyde (5 mols)
183 parts of guanidine nitrate (1.5 mols)
47.9 parts of water (2.66 mols)
44.9 parts of concentrated sulfuric acid (95.5%) (0.439 mol)
Total water: 26.3 mols The procedure of Example 1 is followed, and a resin is obtained which has a density in the neighborhood of 15 to 17.5 lbs./cu. ft., a good capacity for removing anions from solution, and a substantially chalk-like physical appearance.

Example 4

318 parts of water (17.7 mols)
126 parts of melamine (1 mol)
10.3 parts of triethanolamine (.0689 mol)
405 parts of 37% formaldehyde (5 mols)
183 parts of guanidine nitrate (1.5 mols)
47.9 parts of water (2.66 mols)
44.9 parts of concentrated sulfuric acid (95.5%) (0.439 mol)
Total water: 20.3 mols The procedure of Example 1 is followed, but the resin obtained is substantially vitreous in physical form and possesses a higher density than the products of the preceding examples.

Example 5

216 parts of water (12 mols)
126 parts of melamine (1 mol)
10.3 parts of triethanolamine (.0689 mol)
405 parts of 37% formaldehyde (5 mols)
183 parts of guanidine nitrate (1.5 mols)
38.2 parts of water (2.12 mols)
44.9 parts of concentrated sulfuric acid (95.5%) (0.439 mol)
Total water: 14.1 mols The procedure of Example 1 is followed, and the resin obtained is a vitreous material of high density.

Example 6

1110 parts of water (61.4 mols)
126 parts of melamine (1 mol)
10.3 parts of triethanolamine (.0689 mol)
405 parts of 37% formaldehyde (5 mols)
183 parts of guanidine nitrate (1.5 mols)
156 parts of water (8.66 mols)
44.89 parts of concentrated sulfuric acid (95.5%) (0.439 mol)
Total water: 70.1 mols The procedure of Example 1 is followed, but the gel which forms is too soft for curing and subsequent evaluation.

It will be apparent from the preceding examples that the amount of water present in the reaction mixture prior to gelation of the condensation product of, on the one hand, a substance containing a guanido group such as guanidine nitrate with, on the other hand, the condensation product of an amino compound such as urea or melamine with an aldehyde such as formaldehyde is a critical factor in the formulation of a resin since the density of the resin can be regulated thereby. I have found that the density of a particular resin of the type covered in the above-referred-to Dudley application may be decreased without a substantial accompanying decrease in anion exchange capacity if the amount of water present at the gelation stage is between 25–50 mols per mol of melamine or other amino compound of that type. It is not necessary to use more than about 30 mols of water for each mol of amino compound and this constitutes the preferred embodiment of my invention, but any proportion from 25–50 mols of water per mol of amino compound is operative and within the scope of the invention. It will be apparent from Example 6 that too much water will result in a soft gel not adaptable for conversion into a resin suitable for anion exchange application, while too little water will not produce a porous lightweight resin but, on the other hand, one which is vitreous and heavy.

The specific examples are all directed to the use of melamine-formaldehyde condensation products. While these resins are generally preferred as the insolubilizing material for the guanido compound, other aminotriazine-aldehyde resins may be used. Among these are resins produced by condensing an aldehyde such as formaldehyde, acetaldehyde, propionaldehyde, butyraldehyde, cinnamyl aldehyde, benzaldehyde, furfural, etc., with one or more of the aminotriazines, e. g., melamine and its derivatives such as 2,4,6-triethyl-triamino-1,3,5-triazine and 2,4,6-triphenyl-triamino - 1,3,5 - triazine, 2,4,6 - trihydrazino-1,3,5-triazine, as well as triazines containing one or two amino groups such as the guanamines, e. g., formoguanamine and lauroguanamine, 2-amino-1,3,5-triazine and their substitution products. Obviously commercial mixtures of the various aminotriazines or mixtures thereof with other amino compounds may be used if desired. One example of such a commercial mixture is the product obtained by heating dicyandiamide sufficiently to obtain a significant amount of melamine together with other reactive amino bodies. Part of the aminotriazine may be replaced by another amino compound such as, for example, urea, thiourea, dicyandiamide, alkyl ureas, etc. In general I have found that optimum activity is obtained when melamine alone is used as the insolubilizing agent for the guanido compound, the other conditions of reaction and the other reactants being the same. However, in some instances, for economic or other reasons it may be desirable to replace part of the melamine with urea or a similar compound. In such cases it is preferable that the weight ratio of melamine to urea be at least 2:1, but my invention is applicable even where the ratio of melamine to urea is as low as 1:1.

In some instances it may be desirable to include other formaldehyde reactive materials with the aminotriazine or mixtures of aminotriazines and other amino bodies. Examples of such substance are phenol, cresol, xylenol, aniline, phenylene diamine, quinoline, etc.

The substances containing a guanido group include guanidine, guanidine salts such as the nitrate, carbonate, acetate, formate, phthalate, benzoate, chloride, etc., substituted guanidines, biguanide, substituted biguanides, guanyl urea, etc. Any substance containing a guanido group may be used in accordance with this invention. Guanidine compounds including the N-aryl or N-alkyl guanidines may be employed, and the condensation products of these guanido compounds with the aldehyde may be prepared from the free bases themselves or from their salts. Usually it will be more convenient to employ the salts rather than the free bases although it is obviously immaterial which is employed insofar as the resulting product is concerned. These substances containing a guanido group may be condensed with any aldehyde including those referred to above with which the amino compound may be condensed. The various aldehyde condensation products, however, are preferably formaldehyde condensation products. Obviously polymers of formaldehyde or substances which yield formaldehyde may be used in place of the formaldehyde itself.

The condensation products of the present invention may be produced by any suitable process or with any desired combining ratio of aldehyde to the mixture of reactive materials including the amino compound and the substance containing a guanido group. Most suitable ratios of amino compound to the substance containing a guanido group are from about 1:1 to 1:2 on a molar basis. Generally I prefer to use from about 5 to 6 mol of aldehyde per mol of amino compound, of the type of melamine, urea, etc., although ratios of from about 1:2 up to considerably more than 6:1 may be used. The molar ratio of aldehyde to the reactive materials should not be too high or good gels will not be easily obtainable.

My condensation products are gelled and converted into the insoluble state by means of a strong acid. Acids of at least the strength of acetic acid are particularly suitable and while any of the strong melamine acids may be used, sulfuric acid or phosphoric acid are preferred. Hydrochloric acid is just as effective as the preferred acids, but it is not as practicable because of the difficulty encountered in handling it and its tendency to corrode equipment. The pH of the aqueous syrups containing an amino compound and a compound containing a guanido group is adjusted to about 1-3. The use of sufficient acid to adjust the pH within the range of 1-3 is preferred, although the pH may be adjusted by means of a strong acid to values between 0.5 and 4.

My condensation products of low density are granulated so that the particle size is between about 8 mesh and 60 mesh in size. Products having a particle size larger than about 8 mesh do not have sufficient surface and cause too much channeling of the liquids which are passed therethrough in liquid purification processes. On the other hand, if the particles are smaller than about 60 mesh they will pack and cause a high pressure drop.

The primary use of my relatively porous, low density, anion active resins is, of course, in the field of liquid purification. In this field the materials prepared according to the present invention possess many outstanding advantages.

In the first place, since the resin is less dense than a similar resin of substantially the same capacity, its cost per cubic foot is considerably less and the resin is therefore much more attractive commercially.

Another practical advantage of the resins of the present invention is the fact that their porosity decreases the amount of rinse water needed in the activation and regeneration processes. This can be a most significant factor in a successful commercial anion exchange process. For example, when portions of the resins of Example 2 and Example 5 are placed in ion exchangers and after exhaustion, regenerated with 3 pounds of a 2% solution of sodium hydroxide per cubic foot of resin and then rinsed with demineralized water at the rate of 10 volumes per hour, the following results are observed:

| Volume rinse per unit volume of resin | P. P. M. of sodium in the rinse effluent | |
|---|---|---|
| | Resin of Example 2 | Resin of Example 5 |
| 1.92 | 7.0 | ------ |
| 2.07 | ------ | 35.5 |
| 7.68 | 1.0 | ------ |
| 8.28 | ------ | 9.0 |
| 11.42 | ------ | 3.0 |

The anion active resins of the present invention may be activated and regenerated in the usual way be treatment with dilute alkaline solutions such as, for example, 0.1 to 10% aqueous solutions of sodium hydroxide, sodium carbonate, etc.

The resinous materials produced in accordance with this invention are suitable for the removal of all kinds of acids and anions in general from liquid media, and for the exchange of all such anions in liquid media. They may be used to extract the strong mineral acids (preferably in relatively low concentrations) and the weaker organic acids such as acetic acid, oxalic acid, etc., from water. Moreover, the anions of solids such as the chloride anion of ammonium chloride and the sulphate anion of ammonium sulphate may be removed by means of the resinous products described.

The anion active resins are useful for many purposes. They may be used to remove acid from water or from alcoholic solution, to purify aqueous solutions containing sugar including sugar juices, to remove acid from aqueous formaldehyde solutions, pectin solutions, etc. While the resins are especially suitable for the removal of anions from aqueous media, they may also be used to extract acids or anions from liquid media other than water.

Still another application of my anion active resins of low density produced according to the present invention is the decolorization of solutions which contain colored material and also of solutions which contain organic impurities. Important examples of such solutions are sugar solutions including raw sugar juices.

The resins may be used as absorbents for plant nutrients and as such may be used as a media for growing plants or as a means of applying nutrients to the soil.

To be sufficiently insoluble for practical use in the water purification art, resins should have a sufficiently low solubility that they will not be dissolved rapidly by the solution to be treated. Thus water should not dissolve more than one part of resin in 1000 parts of water when the water is passed through a bed of resin after the first cycle comprising an activation, an exhaustion, and a reactivation of the resin.

In the specification the expression "amino compound" is intended to refer to such compounds as melamine, urea, etc., which are normally aldehyde-reactive. Compounds such as quanidines, guanyl urea and biguanides are always referred to as substances containing the guanido group, i. e.,

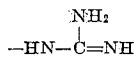

I claim:

1. In the preparation of a granular, water-insoluble resinous material by condensing a melamine-formaldehyde condensation product in water with guanidine nitrate, the molar ratio of the melamine to the guanidine nitrate being about 1:1.5 and melamine, formaldehyde and guanidine nitrate being the sole reactants in the condensations, adding sufficient strong acid to adjust the pH to 0.5–4, thereby converting the resulting product to the substantially water-insoluble stage, drying the product and granulating the dried product, the method of decreasing the density of the granular water-insoluble resinous material to be prepared which comprises carrying out the reaction in the presence of about 30 mols of water for each mol of melamine and corresponding mol and a half of guanidine nitrate.

2. In the preparation of a granular, water-insoluble resinous material by condensing, as sole reactants, (1) the condensation product of an aldehyde-reactive aminotriazine and an aldehyde, as sole reactants, and (2) a substance containing a guanido group selected from the group consisting of guanidine, N-aryl guanidines, N-alkyl guanidines, biguanide, guanyl urea and salts thereof, the molar ratio of the aldehyde-reactive aminotriazine to the substance containing a guanido group being from 1:1 to 1:2, adding sufficient strong acid to cause the reaction product to gel, drying the gel and granulating the dried gel, the method of decreasing the density of the granular, water-insoluble material to be prepared which comprises carrying out the condensation reaction in the presence of from 25–50 mols of water for each mol of aldehyde-reactive aminotriazine.

3. A method in accordance with claim 2 in which the aldehyde-reactive aminotriazine is melamine and the aldehyde, formaldehyde.

4. A method in accordance with claim 2 in which the substance containing a guanido group is a guanidine salt.

CHARLES G. LAUBE.

REFERENCES CITED

The following references are of record in the file of this patent:

UNITED STATES PATENTS

| Number | Name | Date |
|---|---|---|
| 2,228,514 | Griessbach | Jan. 14, 1941 |
| 2,251,234 | Swain | July 29, 1941 |
| 2,285,750 | Swain | June 9, 1942 |
| 2,328,593 | Widmer | Sept. 7, 1943 |
| 2,395,825 | Hesler | Mar. 5, 1946 |

FOREIGN PATENTS

| Number | Country | Date |
|---|---|---|
| 566,789 | Great Britain | Jan. 15, 1945 |